United States Patent
Wu et al.

(10) Patent No.: US 6,801,023 B2
(45) Date of Patent: Oct. 5, 2004

(54) DC/DC BOOST CONVERTER AND CONTROL METHOD THEREFOR

(75) Inventors: Chin-Chang Wu, Kaohsiung (TW); Hurng-Liang Chou, Kaohsiung (TW); Ming-Hong Chiueh, Kaohsiung (TW); Yao-Jen Chang, Kaohsiung (TW)

(73) Assignee: UIS Abler Electronics Co., Ltd., Taipei Hsien (TW)

(*) Notice: Subject to any disclaimer, the term of this patent is extended or adjusted under 35 U.S.C. 154(b) by 28 days.

(21) Appl. No.: 10/420,812

(22) Filed: Apr. 23, 2003

(65) Prior Publication Data
US 2004/0066179 A1 Apr. 8, 2004

(30) Foreign Application Priority Data
Oct. 8, 2002 (TW) .................................. 91123386 A

(51) Int. Cl.⁷ ............................................. G05F 1/656
(52) U.S. Cl. ................... 323/222; 323/299; 323/284
(58) Field of Search .......................... 323/222, 282, 323/284, 299

(56) References Cited

U.S. PATENT DOCUMENTS

| | | | |
|---|---|---|---|
| 6,215,287 B1 * | 4/2001 | Matsushiro et al. ........ | 323/222 |
| 6,232,752 B1 * | 5/2001 | Bissell ........................ | 323/225 |
| 6,236,191 B1 * | 5/2001 | Chaffai ....................... | 323/225 |
| 6,476,588 B2 * | 11/2002 | Fohler ........................ | 323/222 |
| 6,650,092 B1 * | 11/2003 | Lidak et al. ................ | 323/207 |
| 6,690,143 B2 * | 2/2004 | Lin et al. .................... | 323/222 |
| 6,690,144 B1 * | 2/2004 | DeNicholas et al. ....... | 323/222 |

* cited by examiner

*Primary Examiner*—Bao Q. Vu
(74) *Attorney, Agent, or Firm*—Bacon & Thomas PLLC

(57) ABSTRACT

A DC/DC boost converter is consisted of an inductor, a power electronic switch, a control circuit, a first diode, a second diode and a capacitor. The power electronic switch is not operated if the input DC voltage is higher than the specified low reference DC voltage and it is regarded as the normal input DC voltage. If the input DC voltage is lower than the specified low reference DC voltage and this condition is regarded as the abnormal input DC voltage, the power electronic switch is controlled by pulse width modulation control and a dc voltage across the capacitor is created. Then, the output DC voltage is the summation of the input DC voltage and the capacitor voltage. Thus, the inventive DC/DC boost converter operates only when the input DC voltage is abnormal, thereby avoid additional power loss in the duration of normal input DC voltage.

19 Claims, 3 Drawing Sheets

DC/DC BOOST CONVERTER AND CONTROL METHOD THEREFOR

BACKGROUND OF THE INVENTION

1. Field of the Invention

The present invention is related to a DC/DC boost converter and control method therefor. More particularly, the present invention is applied in a DC/DC boost converter and control method therefor, providing a DC voltage within a specified voltage range to the equipment and thereby avoiding the influence caused by abnormal input DC voltage.

2. Description of the Related Art

The DC voltage source is generally obtained from the AC utility via an AC/DC converter or from a battery bank. The load of DC voltage source may be the motor driver, UPS (Uninterruptible Power Supply) or other electronic related equipment. Most of loads must be operated within a specific voltage range. Otherwise, it may result in abnormal operation of downstream electrical loads even the damage of the loads. A DC voltage supplied by the AC/DC converter may be lower than the specified voltage range due to abnormal ac voltage. Similarly, a DC voltage supplied by the battery bank may be lower than the specified voltage range due to the deep discharge. In order to solve the problem of lower input DC voltage, a DC/DC boost converter is applied to maintain normal operation of loads.

FIG. 1 shows the circuit of a conventional DC/DC boost converter. Referring to FIG. 1, a DC/DC boost converter circuit 1 is connected between a DC voltage source with an input terminal $V_{in}$ and a voltage output terminal $V_{out}$. The DC/DC boost converter includes an inductor 10, a power electronic switch 11, a diode 12 and a capacitor 13. The inductor 10 may be energized when the power electronic switch 11 is turned on. When the power electronic switch 11 is turned off, the stored energy in the inductor 10 will release through the diode 12 into the capacitor 13, then, the capacitor is charged and supplied to the loads. The voltage at output terminal $V_{out}$ of the DC/DC boost converter circuit 1 is able to supply a voltage higher than that of the input DC voltage at the input terminal $V_{in}$ by controlling the on/off time of the power electronic switch 11. However, the DC/DC boost converter circuit 1 is operated regardless the input DC voltage is normal or abnormal low voltage caused by the deep discharge of the battery bank or the abnormal ac voltage. Hence, the power loss cannot be avoided regardless the DC voltage source is normal/abnormal in the conventional DC/DC boost converter described above. Generally, the duration of abnormal low voltage in the input DC voltage is only a short interval. However, the conventional DC/DC boost converter circuit 1 is operated regardless the input DC voltage is normal or abnormal. It results in decreasing the power efficiency of the entire equipment. Besides, a larger dimension of a heat dissipation device for the DC/DC boost converter is required to respond to the increase power loss.

The present invention intends to provide a DC/DC boost converter and control method therefore, which actuates when the input DC voltage is lower than the low reference DC voltage and disables when the input DC voltage is higher than the normal voltage, thereby avoid additional power loss in the duration of normal input DC voltage.

SUMMARY OF THE INVENTION

The primary objective of this invention is to provide a DC/DC boost converter and control method that the normal input DC voltage can directly pass through a diode to supply a voltage to the output terminal. The DC/DC boost converter provides a step-up DC voltage to the output terminal if the input DC voltage is lower than the specified low reference DC voltage, thereby increasing reliability of supplied voltage for downstream loads. Moreover, the power electronic switch of DC/DC boost converter only actuates when the input DC voltage is lower than the specified low reference DC voltage, and disables when the input DC voltage is high than the normal voltage to minimize power loss, thereby increasing the power efficiency of the entire equipment.

The DC/DC boost converter in accordance with the present invention includes an input terminal and an output terminal. The DC/DC boost converter comprises an inductor, a power electronic switch, a control circuit, a first diode, a second diode and a capacitor. The input terminal, contains a positive node and a negative node, is connected to a DC voltage source such as an AC/DC converter or a battery bank. The output terminal, contains a positive node and a negative node, is connected to loads such as inverters or other DC loads. A serial connection of the inductor and the power electronic switch is connected between two nodes of input terminal. The control circuit is connected to the power electronic switch. The first diode is connected between the connection point of the inductor and the power electronic switch, and the positive node of the output terminals. The capacitor and the second diode are parallel connected between the positive node of the input terminal and the positive node of the output terminal. The power electronic switch is not operated if the input DC voltage is higher than the specified low reference voltage. In this duration, the DC/DC boost converter does not step-up the input DC voltage, the input DC voltage directly passes through the second diode to the output terminals to supply the loads, and thus the voltage of output terminal is approximated as the input DC voltage. The inventive boost converter actuates when the input DC voltage is lower than the specified low reference voltage, and the pulse width modulation control is used to turn on/off the power electronic switch to step-up the DC input voltage to the acceptable voltage of loads in the output terminals. The inductor is energized when the power electronic switch is turned on, and the inductor releases the stored energy when the power electronic switch is turned off. Then the released energy of the inductor passes through the first diode to the capacitor to provide a voltage that supplies a reverse bias to the second diode. Consequently, the output DC voltage is the summation of the input DC voltage and the capacitor voltage. Thus, it accomplishes the step-up function.

The DC/DC boost converter is provided with the function of step-up the input DC voltage and used to increase the operation range of the input DC voltage, thereby avoiding mal-function of electrical equipment due to a lower voltage supplying from the input DC voltage. Moreover, the inventive DC/DC boost converter dose not actuate when the input DC voltage is normal, and it only actuates when the input DC voltage is lower than the specified low reference voltage, It means that the power loss due to the operation of inventive DC/DC boost converter can be avoided if the input DC voltage is in the normal range. Consequently, the power efficiency of the inventive DC/DC boost converter is better than that of the conventional DC/DC boost converter.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
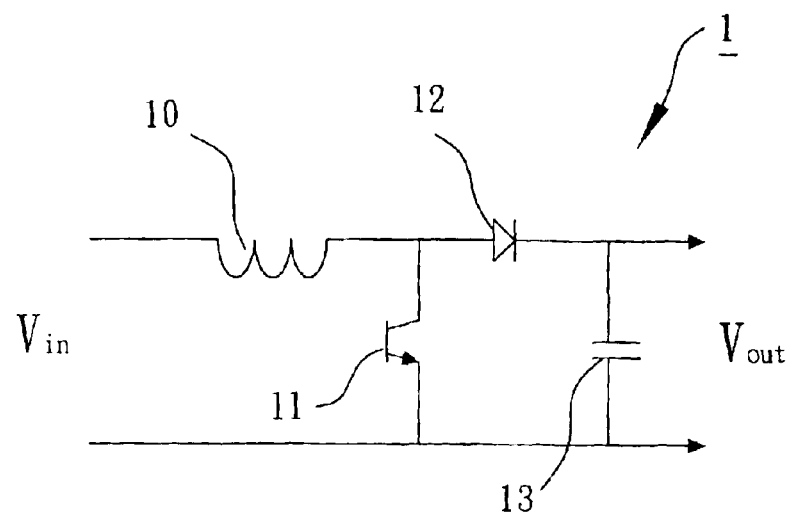
FIG. 1 is a structural schematic view of a conventional DC/DC boost converter in accordance with the prior art.
Figure 2:
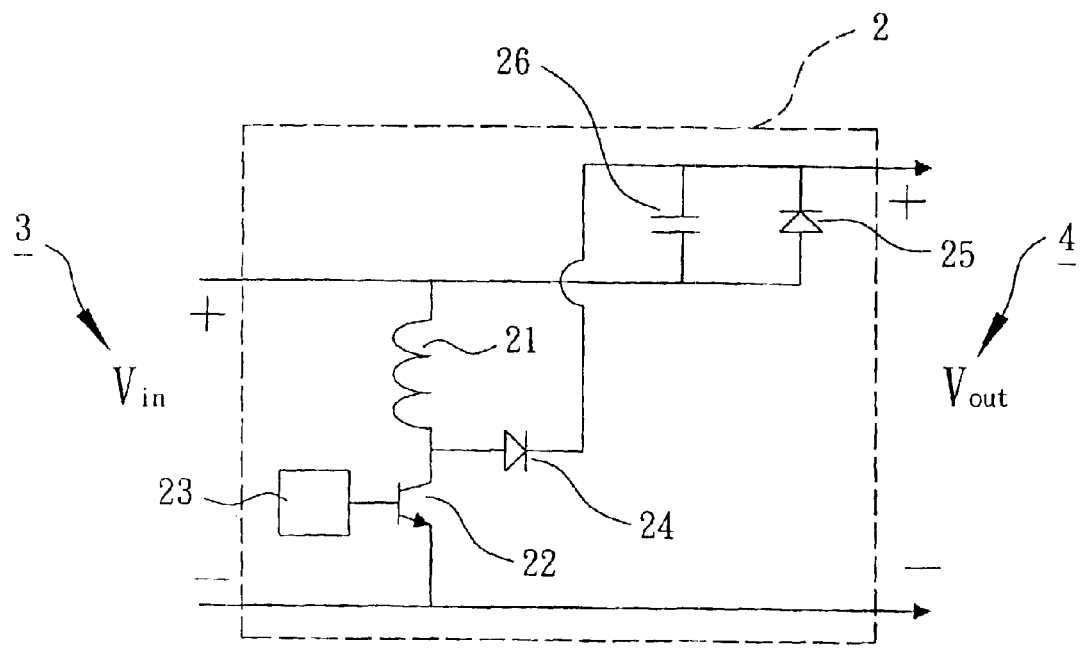
FIG. 2 is a structural schematic view of a DC/DC boost converter in accordance with an embodiment of the present invention.

FIG. 2 illustrates a structural schematic view of a DC/DC boost converter in accordance with an embodiment of the present invention. Referring to FIG. 2, the DC/DC boost converter 2 includes an input terminal 3, contains a positive node and a negative node, connected to the input DC voltage source that may be an AC/DC converter or a battery bank, and an output terminal 4, contains a positive node and a negative node, connected to a load that may be an inverter or the DC electrical equipment. The DC/DC boost converter 2 is operated to provide a regulated DC voltage at the output terminal 4 for supplying to the loads. Thereby the load is able to avoid mal-function due to the lower input DC voltage supplying from the DC voltage source.

Referring again to FIG. 2, the DC/DC boost converter 2 includes an inductor 21, a power electronic switch 22, a control circuit 23, a first diode 24, a second diode 25 and a capacitor 26. In FIG. 2, the inductor 21 and the power electronic switch 22 are serially connected between two nodes of the input terminal 3. The control circuit 23 is connected to the power electronic switch 22. The first diode 24 is connected between the connection point of the inductor 21 and the power electronic switch 22 and a positive node of the output terminal 4. A parallel connection of the capacitor 26 and the second diode 25 is connected between the positive node of the input terminal 3 and the positive node of the output terminal 4.

Figure 3:
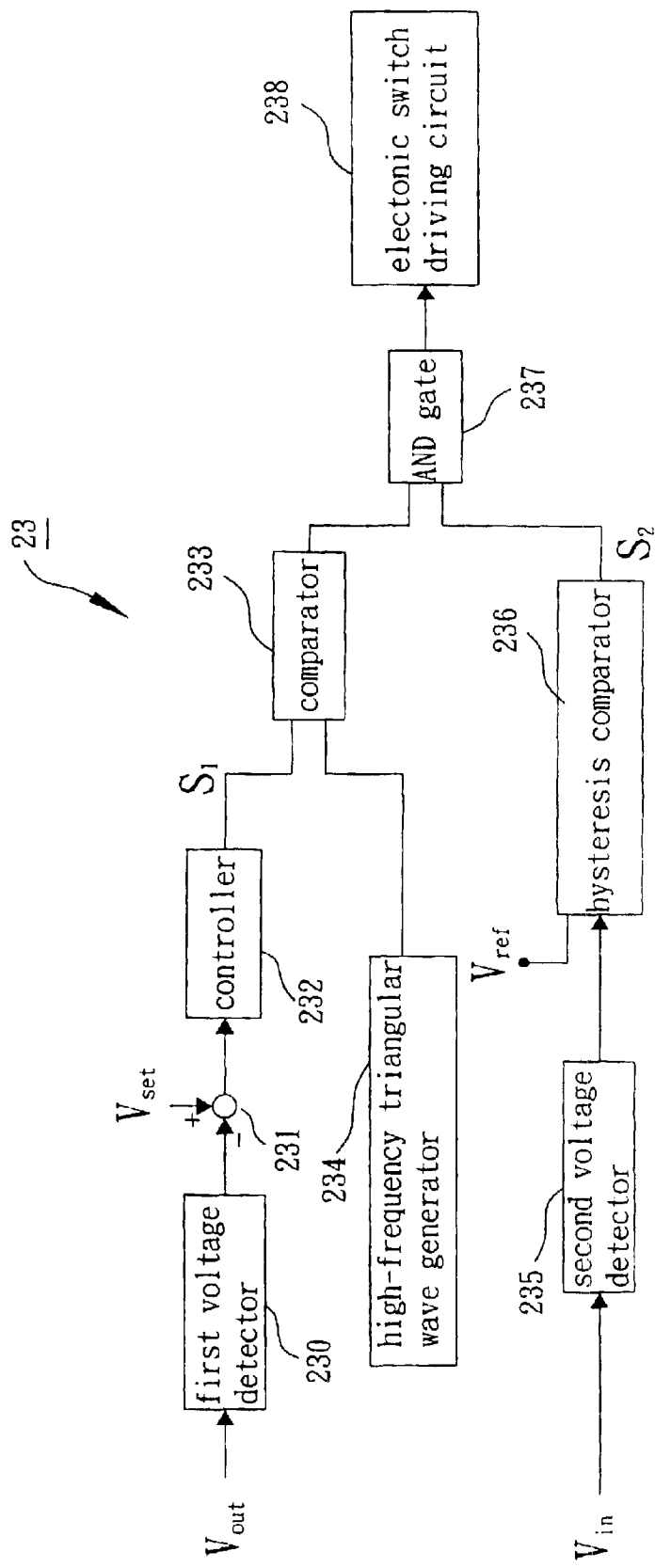
FIG. 3 is a block diagram of a control circuit of the DC/DC boost converter in accordance with the embodiment of the present invention.

Referring to FIG. 3, the control circuit 23 includes a first voltage detector 230, a subtractor 231, a controller 232, a comparator 233, a high-frequency triangular wave generator 234, a second voltage detector 235, a hysteresis comparator 236, an AND gate 237 and an power electronic switch driving circuit 238.

Referring to FIG. 3, the first voltage detector 230 is connected to the output terminal 4 to detect the output voltage $V_{out}$. Subsequently, the output voltage $V_{out}$ is sent to a negative terminal of the subtractor 231 and a positive terminal of the subtractor 231 is connected to a preset voltage $V_{set}$. The result of subtractor 231 is sent to the controller 232 to obtain a first control signal $S_1$. The preset voltage $V_{set}$ is the expected value of an output DC voltage. The high-frequency triangular wave generator 234 is used to generate a high-frequency triangular wave signal. The high-frequency triangular wave signal and the first control signal $S_1$ are sent to the comparator 233 to obtain a pulse-width modulation signal. Meanwhile, the second voltage detector 235 is used to detect the input DC voltage $V_{in}$ supplied from the input DC voltage source. The reference DC voltage $V_{ref}$ and the input DC voltage $V_{in}$ are sent to the hysteresis comparator 236 to generate a second control signal $S_2$. And then, the second control signal $S_2$ and the pulse-width modulation signal are sent to the AND gate 237. The output signal of the AND gate 237 is sent to the power electronic switch driving circuit 238 to generate a drive signal, and subsequently it is sent to the power electronic switch 22 for controlling turn-on or turn-off.

Referring to FIG. 3, the hysteresis comparator 236 is used to generate a specified high reference DC voltage and a specified low reference DC voltage according to the reference DC voltage $V_{ref}$. When the input DC voltage $V_{in}$ detected by the second voltage detector 235 is lower than the specified low reference DC voltage, the hyperthesis comparator 236 generates a high voltage level of the second control signal $S_2$ and the DC/DC boost converter 2 is actuated. Meanwhile, the subtractor 231 subtracts the output voltage $V_{out}$, which is supplied from the first voltage detector 230, from the preset voltage $V_{set}$. And then, the output of subtractor is sent to the controller 232 to thereby generate the first control signal $S_1$. The comparator 233 compares the first control signal $S_1$ with the triangular waveform generated by the triangular wave generator 234 to thereby generate the pulse-width modulation signal. Since the second control signal $S_2$ is a high voltage level, the pulse-width modulation signal is sent to the power electronic switch driving circuit 238 that the power electronic switch 22 can be turned on or off by pulse-width modulation. Referring again to FIG. 2, the inductor 21 is energized to store energy when the power electronic switch 22 is turned on. The stored energy of the inductor 21 is released through the first diode 24 to charge the capacitor 26 to form a capacitor voltage that cuts off the second diode 25 when the power electronic switch 22 is turned off. Consequently, the voltage of the output terminal 4 is the summation of the DC voltage $V_{in}$ supplied from the input terminal 3 and the capacitor voltage of the capacitor 26 serially connected thereto, and it is accomplished the function of step-up input DC voltage. When the DC voltage $V_{in}$ supplied from the input terminal 3 is lower than the specified low reference DC voltage, the DC/DC boost converter 2 accomplishes the function of step-up input DC voltage to avoid the abnormal operation of the load due to a low voltage of output terminal 4.

Referring again to FIG. 3, when the DC voltage $V_{in}$ detected from the second voltage detector 235 is higher than the specified high reference DC voltage, the second control signal S2 supplied from the hysteresis comparator 236 is changed to a low voltage level. And then, the output of AND gate 237 is also changed to a low voltage level regardless the pulse-width modulation signal generated by comparator 233, and the power electronic switch 22 is forced to be turned off continuously.

Referring again to FIG. 2, when the power electronic switch 22 is turned off continuously, the DC/DC boost converter 2 is not actuated and the input DC voltage $V_{in}$ is directly passing through the diode 25 to the output terminal 4 to supply the load. Then, the voltage of the output terminal 4 is approximated as the input DC voltage, and it does not have the function of step-up input DC voltage. Since the DC/DC boost converter 2 is not actuated, it can avoid the power loss caused by unnecessary operation of power electronic switch. In general, the abnormal duration of input DC voltage is very short as compared with that of the normal duration; hence, the proposed DC/DC boost converter has the advantage of high power efficiency.

Figure 4:
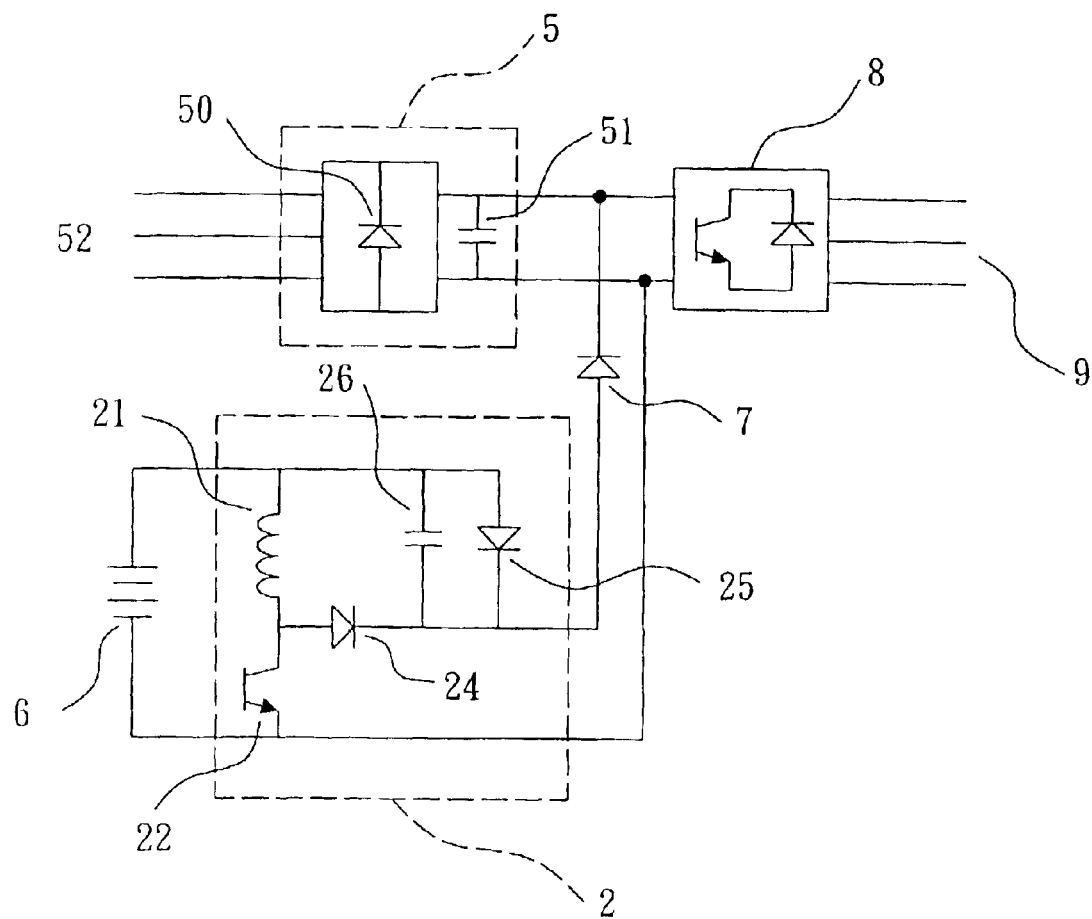
FIG. 4 is a structural schematic view of the DC/DC boost converter in accordance with the embodiment of the present invention applied to a double DC voltage source system.

Referring to FIG. 4, it illustrates the DC/DC boost converter in accordance with the embodiment of the present invention applied to a double DC voltage source system. A first DC voltage source 5 includes an AC/DC converter 50 and a filter capacitor 51. The AC/DC converter 50 converts the AC voltage supplied from an AC power source terminal 52 into a DC voltage, and the filter capacitor 51 is used to smooth the DC voltage. A second DC voltage source 6 is supplied from a battery bank; subsequently, it is connected to the input terminal 3 of DC/DC boost converter 2; finally, it is parallel connected to the first DC voltage source 5 via a diode 7. The load is an inverter 8 to supply an AC voltage to a AC load 9. The first DC voltage source 5 can supply a DC voltage higher than the specified low reference DC voltage for the normal operation of inverter 8, and the second DC voltage source 6 supplies a DC voltage smaller than the normal DC voltage of first DC voltage source 5. When the AC power source terminal 52 supplies a normal AC voltage, the first DC voltage source 5 can supply a normal DC voltage and the DC/DC boost converter 2 is not actuated. Since a DC voltage supplied from the DC voltage source 5 is higher than that supplied from the DC voltage source 6, it results in a reverse bias voltage to cut off the diode 7. In this condition, the first DC voltage source 5 supplies the required DC power to the inverter 8. When the voltage supplied from the AC power source terminal 52 is failed or the DC voltage of DC voltage source 5 is smaller than the voltage of the second DC voltage source 6, the voltage of the second DC voltage source 6 provides a DC voltage to the inverter 8 through the diode 25 and diode 7. And then, the voltage of the second DC voltage source 6 is higher than low reference DC voltage for normal operation of the inverter 8 to maintain the inverter 8 operated normally. Thus, the DC voltage demanded by the inverter 8 is supplied from the second DC voltage source 6 not the first DC voltage source 5. When the voltage of the second DC voltage source 6 is discharged and it is lower than the specified low reference DC voltage (the smallest DC voltage for normal operation of the inverter 8). The DC/DC boost converter 2 is actuated to have the function of step-up DC voltage. And then the DC/DC boost converter 2 maintains the voltage of output terminal 4 within the voltage range for the normal operation of inverter 8. Once the AC voltage supplied from the AC power source terminal 52 is recovered to normal condition, the DC voltage of the first DC voltage source 5 is higher than the specified high reference DC voltage preset in the DC/DC boost converter 2. Then, the DC/DC boost converter 2 is disabled. Since the diode 7 is reverse-biased, the DC voltage of the inverter 8 is transferred to be supplied from the first DC voltage source 5 again. The second DC voltage source 6 acts as a back-up power through the DC/DC boost converter 2 to supply a DC voltage to the inverter 8 when the AC power source terminal 52 fails. Therefore, the DC/DC boost converter 2 has the function of step-up battery voltage when the low battery voltage occurs due to the deep discharge of the second DC voltage source 6. It is fully employed the energy stored in the battery bank of the second DC voltage source 6 so that the battery can be discharged deeply. Consequently, the second DC voltage source 6 can adopt little amount of batteries in the battery bank.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A DC/DC boost converter, comprising:
    an input terminal contains a positive node and negative node to be connected to a dc voltage source;
    an output terminal contains a positive node and negative node to supply a well regular dc voltage to the loads;
    an inductor used to store and release the energy for step-up voltage;
    a power electronic switch serially connected to the inductor to form a serial connection, and connected between the positive and negative nodes of input terminal;
    a control circuit adapted to detect an input DC voltage at the input terminal and an output voltage at the output terminal of the DC/DC boost converter, thereby determining the on or off state of the power electronic switch;
    a first diode connected between a connection point of the inductor and the power electronic switch, and the positive node of the output terminal;
    a capacitor connected between the positive node of the input terminal and the positive node of the output terminal; and
    a second diode parallel-connected to the capacitor;
    wherein the dc voltage of output terminal is regulated within a rang regardless the dc voltage of input terminal is normal or abnormal; the DC/DC boost converter is not actuated when the dc voltage of input terminal is normal and actuated when the dc voltage of input terminal is abnormal; when the DC/DC boost converter is actuated, the DC voltage of the output terminal is the summation of the input terminal voltage and the capacitor voltage, thereby supplying a total voltage higher than the input terminal voltage.

2. The DC/DC boost converter as defined in claim 1, wherein the first diode is a path for releasing the energy stored in the inductor to charge the capacitor.

3. The DC/DC boost converter as defined in claim 1, wherein the second diode acts as a bypass path for supplying the output voltage of output terminal form the input voltage of input terminal directly.

4. The DC/DC boost converter as defined in claim 1, wherein the control circuit has a specified high/low reference DC voltage compared to the input terminal voltage to determine to actuate the DC/DC boost converter or not.

5. The DC/DC boost converter as defined in claim 1, wherein the power electronic switch is continuously turned off when the input DC voltage is higher than the specified low reference DC voltage; thus the DC/DC boost converter is not actuates and the input DC voltage passes through the second diode to the output terminal directly.

6. The DC/DC boost converter as defined in claim 1, wherein the pulse-width modulation control is actuated when the input DC voltage is lower than the specified low reference DC voltage; the inductor is energized when the power electronic switch is turned on; when the power electronic switch is turned off, the inductor releases its storage energy through the first diode to the capacitor to form a voltage that the second diode is reverse-biased; the total voltage of the output terminal is the summation of the input DC voltage and the capacitor voltage so that the voltage supplied from the output terminal is maintained within a voltage range for the normal operation of loads.

7. The DC/DC boost converter as defined in claim 1, wherein the control circuit includes a first voltage detector, a subtractor, a controller, a comparator, a high-frequency triangular wave generator, a second voltage detector, a hysteresis comparator, an AND gate and a power electronic switch driving circuit.

8. The DC/DC boost converter as defined in claim 7, wherein the first voltage detector is connected to the output terminal for detecting the output voltage that is sent to the subtractor, the controller, a high-frequency triangular wave generator and the comparator to thereby obtain a pulse-width modulation signal which is sent to a first input terminal of the AND gate.

9. The DC/DC boost converter as defined in claim 7, wherein the second voltage detector is connected to the input terminal for detecting the input DC voltage that is sent to the hysteresis comparator to thereby determine the input DC voltage is normal or not; the hysteresis comparator further connected to the AND gate.

10. The DC/DC boost converter as defined in claim 7, wherein if the input DC voltage is lower than the specified low reference DC voltage, the input DC voltage is regarded as abnormal voltage.

11. The DC/DC boost converter as defined in claim 7, wherein the if the input DC voltage is within the voltage range of the specified high reference and the specified low reference DC voltage, the output of hysteresis comparator is maintained as the previous state.

12. The DC/DC boost converter as defined in claim 7, wherein the AND gate is connected to the power electronic switch driving circuit to thereby obtain a driving signal adapted to turn on or off the power electronic switch.

13. The DC/DC boost converter as defined in claim 7, wherein the hysteresis comparator generates a low level signal when the input DC voltage is normal, and then the AND gate generates a continuously low level signal to turn off the power electronic switch.

14. The DC/DC boost converter as defined in claim 7, wherein the hysteresis comparator generates a high level signal when the input DC voltage is lower than the specified low reference DC voltage, and then the AND gate generates a pulse-width modulation signal to turn on or off the power electronic switch.

15. The DC/DC boost converter as defined in claim 1, wherein the DC/DC boost converter is applied to a double DC voltage source system; and wherein a first DC voltage source supplied from a AC/DC power converter, and a second DC voltage source supplied from a battery bank; the input terminal of the DC/DC boost converter is connected to the second DC voltage source while the output terminal of the DC/DC boost converter connecting to the first DC voltage source via a diode.

16. The DC/DC boost converter as defined in claim 15, wherein when a voltage of the first DC voltage source is normal, the voltage supplied from the first DC voltage source is higher than the output terminal voltage of the DC/DC boost converter and the power required by the load is supplied from the first DC voltage source.

17. The DC/DC boost converter as defined in claim 15, when the voltage of the first DC voltage source is failure, and the voltage of the second DC voltage source is higher than that of the specified low reference DC voltage, the second DC voltage source supplies the power to load via the diode; the DC/DC boost converter is not actuated.

18. The DC/DC boost converter as defined in claim 15, when the battery set of the second DC voltage source is discharged deeply and voltage of the second DC voltage source is lower than the low reference DC voltage, the DC/DC boost converter is actuated and supplies a step-up DC voltage to the output terminal voltage to within the normal operation rang of load.

19. The DC/DC boost converter as defined in claim 15, wherein the DC/DC boost converter fully employed the energy stored in the battery bank connected to be as the second DC voltage source so that the battery bank can be deeply discharged; thus, the second DC voltage source can adopt little amount of the batteries in the battery bank.

* * * * *